Feb. 3, 1953

P. M. ANGELL 2,627,237

APPARATUS FOR MANUFACTURING ICE-CREAM
CAKE CONFECTIONS AND THE LIKE

Filed April 29, 1950

INVENTOR.
Paul M. Angell
BY
Kegan and Kegan
Attys.

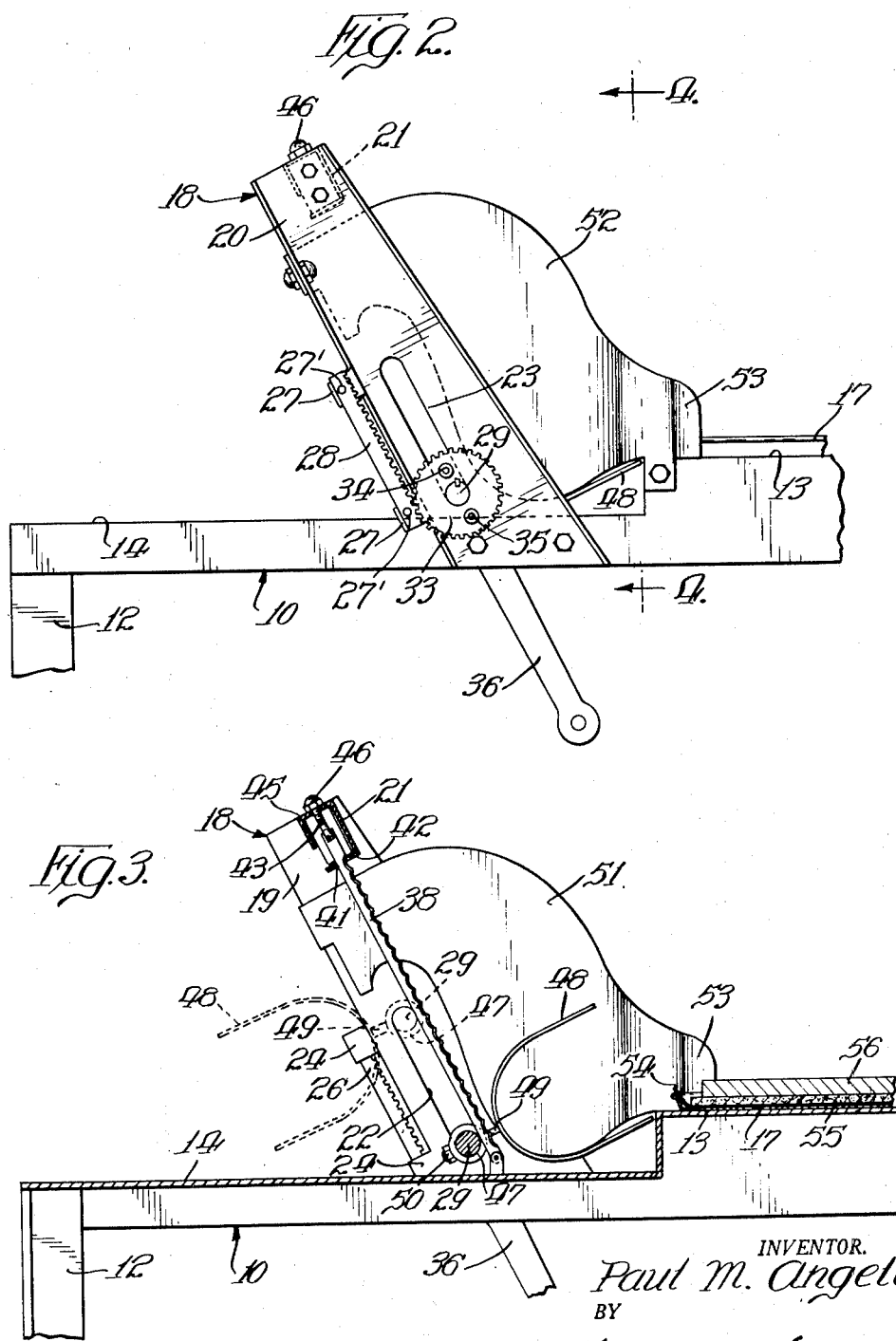

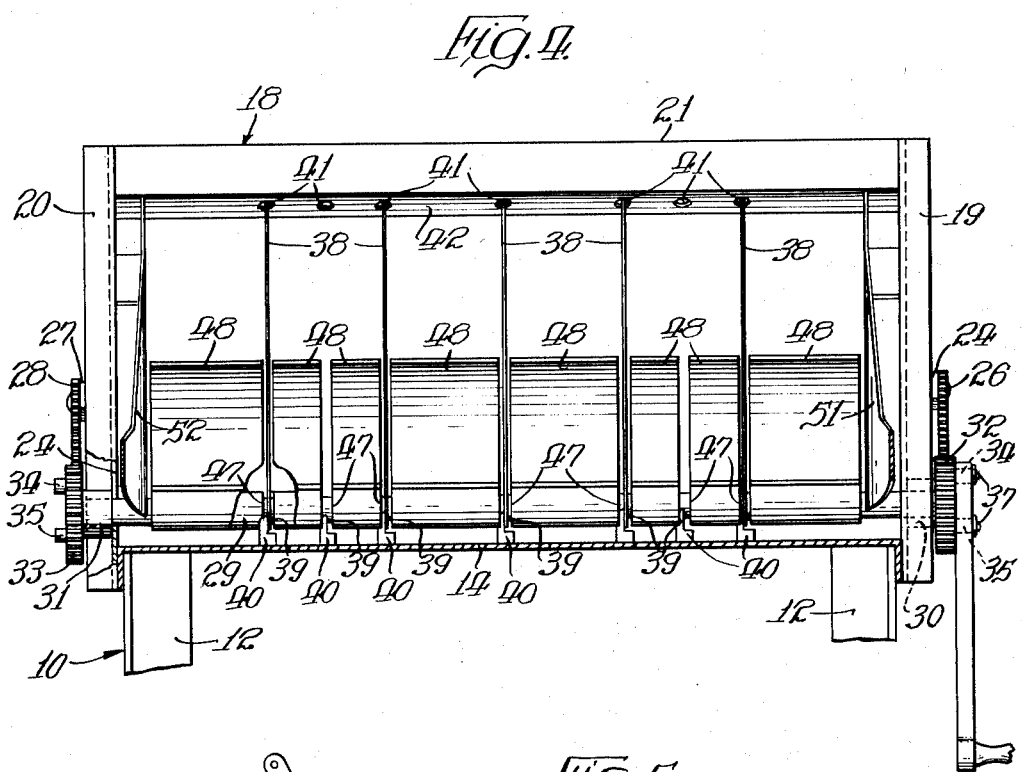
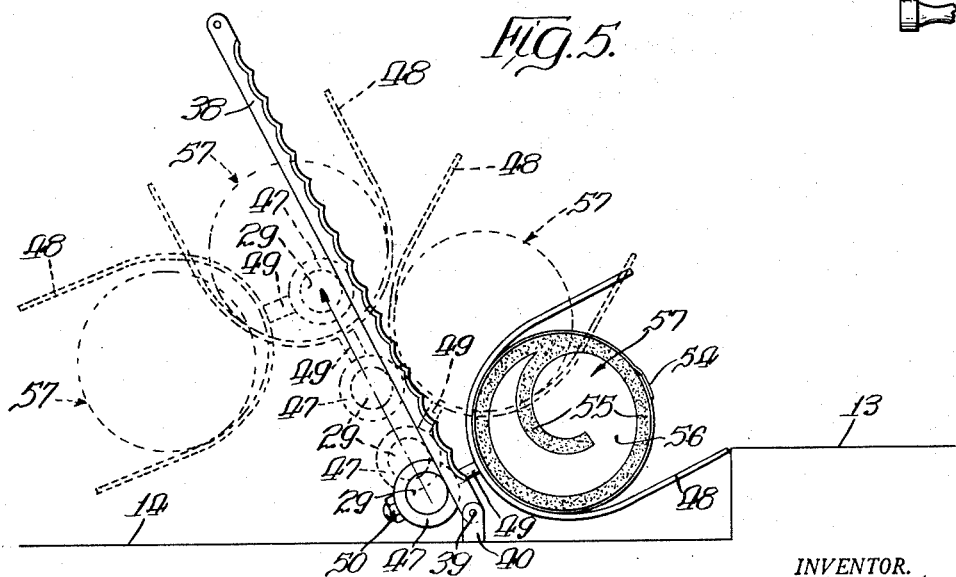

Patented Feb. 3, 1953

2,627,237

UNITED STATES PATENT OFFICE 2,627,237

APPARATUS FOR MANUFACTURING ICE-CREAM CAKE CONFECTIONS AND THE LIKE

Paul M. Angell, Chicago, Ill., assignor to Newly Weds Baking Co., Chicago, Ill., a corporation of Illinois Application April 29, 1950, Serial No. 158,975

7 Claims. (Cl. 107—21)

My invention relates generally to improvements in apparatus for dividing relatively soft, resilient or mushy material into pieces of predetermined size and shape. More particularly, my invention relates to improvements in the apparatus shown and described in the co-pending patent application of Paul M. Angell and William J. Benn, Serial No. 89,297, filed April 23, 1949, and entitled Apparatus for Manufacturing Ice Cream Cake Rolls and the like.

The principal object of my invention is to provide apparatus whereby ice cream cake rolls, jelly rolls and other confections may be quickly assembled, formed, wrapped and cut, with a minimum of handling and effort on the part of the operator and without being touched by human hands.

Another object of my invention is to provide apparatus capable of quickly and efficiently dividing relatively soft and plastic foods, as exemplified by spongy cake having a filling of semi-frozen ice cream, jam, or jelly, into pieces of predetermined size and shape without damaging or making less palatable any of said foods.

A third object of my invention is to provide apparatus of the type specified which is characterized by a simple, inexpensive, and rugged construction.

Another object is the provision of cutting apparatus for ice cream cake confection and the like which is easily maintained clean and sanitary.

To the end of achieving the foregoing and other objects of my invention, my apparatus comprises, broadly speaking, a framework and a carrier for confection thereon, pivot means associated with said carrier and means on the framework constraining said pivot means to rotation about the axis of rotation thereof and to translation in a plane substantially parallel to the plane of one or more stationary cutting members, said carrier further including a confection supporting portion adapted to position the confection on the opposite side of said cutting members from the axis of rotation of said pivot means, whereby as said carrier rotates, said confection-supporting portion intersects said cutting members to sever the confection into a plurality of sections, and means for moving said carrier to follow simultaneously the rotational and translational constraint thereof.

In a commercial embodiment of my invention, the carrier for the confection is in the form of a shaft having a plurality of trough-shaped plates extending therefrom, while the ends of the shaft are movable along a pair of constraining slots in the framework of the apparatus. Pinion gears are secured to said ends of the shaft, and engage a pair of racks which are secured to the framework, so that as said shaft is turned, as for example by a hand crank, it both turns on its axis of rotation and translates along said slots. By constraining the motion of the shaft to a plane parallel to the plane of the cutting members, said shaft may provide backing support for the cutting members as it translates along the slots. Hence, as the trough-shaped plates traverse the cutting members due to the rotational motion of the shaft on which they are mounted, the piece of confection therein is moved along and against said cutting members and thereby severed into a predetermined number of sections.

Advantageously, by means of the aforesaid constraint of the shaft on which the confection carrying plates are mounted, and the use of a rack and pinion arrangement to actuate said shaft in the manner described, a highly compact cutting apparatus is obtained. The operating mechanism is simple, and results in apparatus which is rugged and dependable in operation. In addition, the mechanism is so efficient in operation that the entire device may be hand cranked with little expenditure of energy on the part of the operator. In actual operation, the daily output of the apparatus of the type shown in the drawings is as high as that which can be obtained using the fully automatic apparatus shown and described in application Serial No. 89,297, entitled Apparatus for Manufacturing Ice Cream Cake Rolls and the Like. Yet my new, improved apparatus may be constructed for only about one-fifth to one-sixth of the cost of said automatic apparatus.

In order that my invention may be more fully disclosed, reference is had to the accompanying drawings which illustrates one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 2 is a fragmentary side elevational view of the embodiment of Figure 1;

Figure 3 is a fragmentary side elevational view taken in section on the line 3—3 of Figure 1, the loading position of the apparatus being shown in full line, while the deflected position is shown in dotted outline;

Figure 4 is a fragmentary front elevational view taken in section on the line 4—4 of Figure 2; and Figure 5 is a side elevational view, somewhat schematic, showing successive positions of the apparatus as it is moved from the loading position to the fully deflected position.

Like reference characters designate like parts in the drawings and in the description of my invention which follows.

Figure 1:
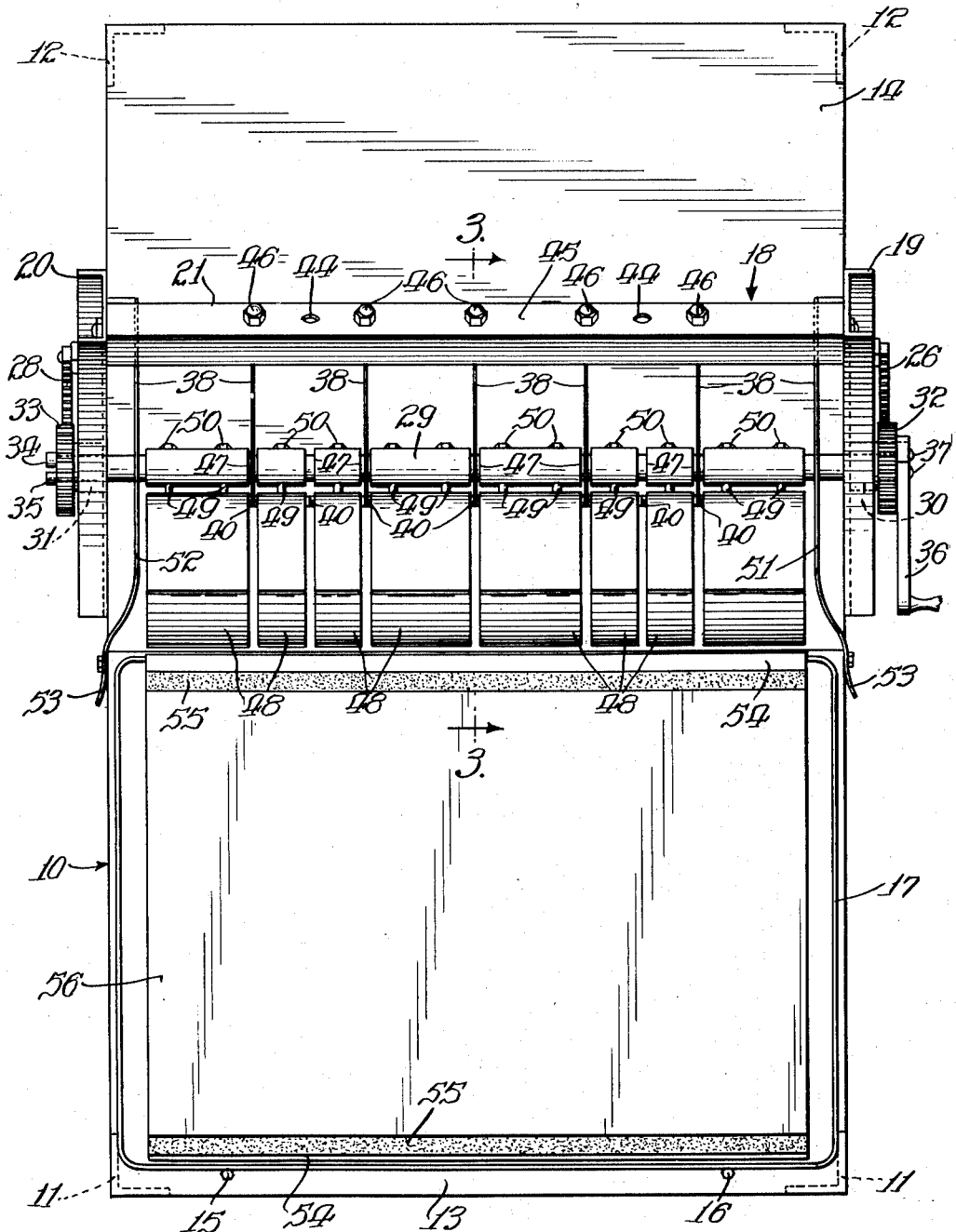
Figure 1 is a plan view of a machine embodying my invention.

Referring now to the drawings, my novel apparatus for use in manufacturing confectionery products is shown as including a table 10 comprising front legs 11, 11, rear legs 12, 12, a work platform 13, and a receiving platform 14. A pair of positioning studs 15 and 16 extend upwardly from the work platform 13, and act as stops for positioning a tray 17 upon the work platform 13.

A frame 18 extends upwardly from and is secured to the table 10, and comprises two channel-shaped uprights or side pieces 19 and 20, and a cross piece 21 spaced from the platforms 13 and 14. As is best shown in Figure 2, the side pieces 19 and 20 are inclined obtusely from the work platform 13, the included angle therebetween being approximately 120 degrees. As is further shown in Figure 2, together with Figure 3, the side pieces 19 and 20 include a pair of substantially straight-sided slots 22 and 23 therein. A pair of ears 24, 24 extends rearwise of the side piece 19, and supports the rack 26 in a position in which it is substantially parallel to the slot 22. Similarly, a pair of ears 27, 27 positions the rack 28 substantially parallel to the slot 23. The racks 26 and 28 may be affixed to the pairs of ears 24, 24 and 27, 27 respectively in any conventional manner. As illustrated in Fig. 2 of the drawings this particular embodiment utilizes pins or rivets such as 27' for this purpose.

Referring now to Figure 4, the two ends of a shaft 29 extend through the slots 22 and 23. Thrust collars 30 and 31 are secured to the shaft 29 to prevent lateral play. Because of the constraint imposed on the shaft 29 by the slots 22 and 23, and the thrust collars 30 and 31, said shaft 29 is limited to rotation about its axis and to translation along said slots 22 and 23. A pair of pinion gears 32 and 33 are secured to the outer ends of the shaft 29, and are meshed with the racks 26 and 28. A pair of studs 34 and 35 extend from each of the gears 32 and 33, so that a hand crank 36 may be drivably secured to one or the other of the gears 32 and 33 by means of the fasteners 37, 37. Upon rotating the crank 36, the shaft 29 is rotated similarly, while at the same time the engagement of the pinion gears 32 and 33 with the racks 26 and 28 acts to translate the shaft 29 along the slots 22 and 23.

Referring now to Figures 3 and 4, the apparatus is shown as further including a plurality of toothed blades 38 which extend between the cross piece 21 and the receiving platform 14. The lower ends of the blades 38 are detachably connected to the pins 39 of the brackets 40 secured to the platform 14. The upper ends of the blades 38 extend through the openings 41 in the lower flange portion 42 of the cross piece 21. A threaded stud 43 is pinned to the upper end of each of the blades 38, and extends through an opening 44 in the upper flange portion 45 of the cross piece 21. By means of a threaded cap 46, each of the studs 43 may be pulled upwardly, to tauten the blades 38. In addition, the shaft 29 is provided with a plurality of circumferential grooves 47 which are aligned with the studs 40. As best shown in Figure 4, the smooth, non-cutting edges of the blades 38 fit within the grooves 47, and are in sliding contact with the shaft 29. The grooves 47 therefore provide both backing and sidewise support for the blades 38 as the shaft 29 translates upwardly along the slots 22 and 23 in the side pieces 19 and 20. Besides reducing vibration and flexure of the blades 38 while the confection is being cut thereby, the useful life of the blades is extended.

A plurality of aligned, trough-shaped plates 48 extend from the shaft 29, and are secured to said shaft by the pins 49 and threaded caps 50. As is best shown in Figures 1 and 4, the various plates 48 are so dimensioned and positioned on the shaft 29 as to provide a space between each two successive plates, whereby the plates 48 may traverse the blades 38 without interfering therewith.

As is further shown in the aforesaid figures, two deflector plates 51 and 52 are positioned adjacent to the inner sides of the side pieces 19 and 20. The front portions 53, 53 of the plates 51 and 52 are configured to assist in positioning the tray 17 on the work platform 13, while the remaining portions of the plates 51 and 52 are convergently tapered toward the shaft 29 (Figure 1) for a purpose to be explained hereinbelow.

Operation of apparatus

The operation and advantages of the apparatus of the drawings will be readily perceived upon consideration of the following exposition as to how it is used in the manufacture of composite ice cream cake rolls, although it would be obvious to those skilled in the art that my invention may also be used to advantage in the manufacture of numerous other products, such as jelly rolls and other food products having a soft, mushy or resilient constituent. Before forming each ice cream cake roll, it is customary first to assemble the ingredients in the manner shown in Figures 1 and 3, wherein a sheet of paper 54, a slab of cake 55 and a layer of freshly made, semi-frozen ice cream 56 are successively placed in the tray 17. The cake 55 is preferably of the type disclosed and claimed in my Patent No. 2,214,917, issued September 17, 1940, and entitled Method of Manufacture of Composite Ice Cream Cake. By means of the sheet of paper 54, the cake 55 and the ice cream 56 thereon may be rolled into a length of confection of more or less spiral cross-section. The resultant length of confection, indicated generally by the numeral 57, is shown in Figure 5 to be cradled by the trough-shaped plates 48. To transfer the length of confection 57 from the tray 17 to the plates 48, the operator merely rolls said confection 57 downwardly into the plates 48 (Figure 3). As the confection 57 slides into the plates 48, the tapered deflector plates 51 and 52 accurately position the confection 57 laterally in said plates 48, and simultaneously smooth the ends of the confection 57.

Next, the operator turns the hand crank 36 in a counterclockwise direction, as viewed in Figure 2. As the hand crank 36 turns, the shaft 29 rotates a corresponding amount, and at the same time translates upwardly along the slots 22 and 23

(Figure 5). As the shaft 29 and the plates 48 deflect in the manner shown, the length of confection 57 is moved along and against the blades 38, and is severed by said blades 38 into a plurality of sections. As the shaft 29 approaches the upper ends of the slots 22 and 23, the trough-shaped plates 48 move into the fully deflected position shown in dotted outline in Figure 3, whereupon the severed length of confection 57 rolls out of the plates 48. In practice, a carton or a plurality of cartons may be pre-positioned upon the receiving platform 14 to receive the severed confection 57.

Advantageously, my apparatus provides means for dividing the length of confection 57 into different numbers and sizes of sections. Thus, with the arrangement of Figure 4, a length of confection 57 which is 24 inches in length is severed into six sections each of which is 4 inches in length. To convert the apparatus to divide the confection 57 into four sections of equal length, all of the toothed blades 38 except the middle one are removed, and two blades 38 thereafter installed in the two empty positions shown in Figure 1.

Since it is possible to form the confection 57 of Figure 5 without the operator touching either the cake 55 or the ice cream 56, it will be seen that the confection 57 can be completely processed without being touched by human hands, since at no time during the cutting operation need the operator touch the confection 57. Moreover, it is a simple matter to keep my apparatus sanitary and clean because of its extremely simple construction and the possibility of using smoothly contoured sheet metal in the formation of the frame 18, the deflector plates 51 and 52, and the trough-shaped plates 48. As is apparent from Figure 1, the deflector plates 51 and 52 prevent particles of the comestible from reaching the operating mechanism of the apparatus. This sanitation feature is highly desirable in apparatus used in the processing of foods for human consumption.

Having thus fully disclosed my invention, and demonstrated its utility by reference to a specific embodiment thereof, I claim:

1. Apparatus for cutting a length of ice cream cake roll or the like into a plurality of sections, comprising: a table having a work surface thereon; two uprights secured to said table on opposite sides thereof and to the rear of said work surface, a crosspiece extending between said uprights and spaced above said work surface, each of said uprights having a straight slot therein inclined obtusely from said work surface, said slots being parallel to each other, a shaft the two ends of which extend through said slots, said shaft having thrust surfaces thereon in sliding contact with said uprights, whereby said shaft is maintained in predetermined relation to said uprights at all times, said shaft further having a plurality of circumferential grooves therein, two pinion gears secured to said shaft at opposite ends thereof, two racks respectively secured to said two uprights to lie parallel to said slots and in engagement with said pinion gears, a crank drivably connected to one end of said shaft, whereby as said crank is turned said shaft both rotates about its own axis and translates along said slots, a plurality of toothed blades extending between and detachably connected to said crosspiece and said table, said blades positioned parallel to said slots and frontwise of said shaft with the smooth edges of said blades positioned within said grooves in said shaft and in sliding contact with said shaft, whereby said shaft provides backing and sidewise support for said toothed blades as it is translated along said slots, a plurality of curved plates secured to said shaft and adapted to receive and cradle a length of ice cream cake roll, said curved plates opening toward said work surface in the undeflected position, said plates positioned intermediate said toothed blades to pass therebetween without interference as said shaft is rotated to move said plates to the deflected position, and two deflector plates positioned on the inner sides of said uprights and extending convergently from said work surface toward said toothed blades, whereby the ends of said ice cream cake roll are smoothed and said roll is aligned in said apparatus when transferred from said work surface to said curved plates.

2. Apparatus for severing a length of confection into a plurality of sections, comprising: a table having a work surface thereon, two uprights secured to said table on opposite sides thereof, and to the rear of said work surface, a crosspiece extending between said uprights and spaced above said work surface, each of said uprights having a straight slot therein inclined obtusely from said work surface, said slots being parallel to each other, a shaft the two ends of which extend through said slots, two pinion gears secured to said shaft at opposite ends thereof, two racks respectively secured to said two uprights to lie parallel to said slots and in engagement with said pinion gears, a crank connected to said shaft, whereby as said crank is turned said shaft both rotates about its own axis and translates along said slots, a plurality of toothed blades extending between and removably connected to said cross piece and said table, each of said blades positioned parallel to said slots and frontwise thereof with the smooth edge of said blades in sliding contact with said shaft, whereby said shaft provides backing support for said toothed blades as it is translated along said slots, and a plurality of curved plates secured to said shaft and adapted to receive and cradle a length of said confections, said plates positioned intermediate said toothed blades to pass therebetween without interference upon rotation of said shaft.

3. Apparatus for severing a length of confection into a plurality of sections, comprising: a work platform, two uprights secured to said platform, a crosspiece between said uprights and spaced from said platform, each of said uprights having a substantially straight slot therein, said slots being parallel to each other, a shaft the two ends of which extend through said slots, two gears secured to said shaft at opposite ends thereof, two racks respectively secured to said two uprights to lie parallel to said slots and in engagement with said gears on said shaft, a crank member connected to said shaft, whereby as said crank member is turned said shaft both rotates about its own axis and translates along said slots, a plurality of toothed blades extending between said work platform and said crosspiece, each of said blades positioned parallel to said slots and frontwise thereof with the smooth edge of said blades in sliding contact with said shaft, whereby said shaft provides backing support for said toothed blades as it is translated along said slots, and a plurality of trough-shaped receptacles carried by said shaft and adapted to receive and to support a length of confection, said receptacles positioned intermediate said toothed blades to pass therebetween without interference upon rotation of said shaft.

4. In apparatus for manufacturing ice cream cake confection and the like, and including a work platform, cutting means comprising: a frame secured to said work platform and including two side pieces and a crosspiece spaced from said work platform, a shaft between said side pieces and having one or more circumferential grooves therein, support means on each of said side pieces constraining said shaft to rotation about its own axis and to translation in a plane between a first and a second position, two racks secured to said two side pieces substantially parallel to said plane of motion of said shaft, two pinion gears secured to said shaft at opposite ends thereof and in engagement with said racks, a crank member drivably connected to said shaft to turn said shaft, one or more cutting blades extending between and detachably secured to said work platform and said crosspiece of said frame, said blades positioned substantially parallel to said plane of motion of said shaft and to one side thereof, said blades further positioned in alignment with said grooves in said shaft and with the non-cutting edges thereof in sliding contact with said shaft, whereby said shaft supports said cutting blades as it moves in said plane of motion, and two or more trough-shaped receptacles carried by said shaft and adapted to receive and support a length of confection, said receptacles spaced apart to provide clearance for said cutting blades as said shaft is turned to move said receptacles through said blades, whereby a length of confection carried by said receptacles is severed into a plurality of sections.

5. In apparatus for manufacturing ice cream cake confection and the like, and including a work platform, cutting means comprising: a frame secured to said work platform and including two side pieces and a crosspiece spaced from said work platform, a shaft between said side pieces, support means on each of said side pieces constraining said shaft to rotation about its own axis and to translation in a plane between a first and a second position, two racks secured to said two side pieces substantially parallel to said plane of motion of said shaft, two gears secured to said shaft at opposite ends thereof and in engagement with said racks, a crank member drivably connected to said shaft to turn said shaft, a plurality of cutting blades extending between said work platform and said crosspiece of said frame, said blades positioned parallel to said plane of motion of said shaft and to one side thereof, and a plurality of trough-shaped receptacles carried by said shaft and adapted to receive and support a length of confection, said receptacles positioned to said one side of said shaft and clear of said blades when said shaft is in said one position, said receptacles being further laterally positioned intermediate said blades, whereby as said crank member is turned said receptacles traverse said blades without interference as said shaft rotates and translates to said second position.

6. In apparatus for manufacturing ice cream cake confection and the like, and including a work platform, cutting means comprising a frame positioned over said work platform and including two side pieces and a crosspiece spaced from said work platform, a shaft between said side pieces, support means on each of said side pieces constraining said shaft to rotation about its own axis and to translation substantially in a plane, two racks secured to said two side pieces and positioned substantially parallel to said plane of motion of said shaft, gear means on said shaft at opposite ends thereof and in engagement with said racks, means for turning said shaft, one or more cutting blades extending between said work platform and said crosspiece of said frame, said blades positioned parallel to said plane of motion of said shaft and to one side thereof, and two or more trough-shaped receptacles carried by said shaft and adapted to receive and support a length of confection, said receptacles spaced apart to provide clearance for said cutting blades as said shaft is turned to move said receptacles between said blades, whereby a length of confection placed in said receptacles is severed into a plurality of sections.

7. In apparatus for manufacturing confection having a filling of soft, resilient or mushy material, said apparatus including one or more stationary cutting blades, means for transporting said confection along and against said cutting blades, and simultaneously slowly rotating said confection relative to said cutting blades, said means comprising: a shaft and means simultaneously constraining said shaft to rotation and to translation in a plane which is substantially parallel to the plane of said cutting blades, said shaft positioned to be in sliding contact with the non-cutting edge of each of said cutting blades, two or more trough-shaped receptacles carried by said shaft and spaced therefrom to be positionable on the other side of said cutting blades from said shaft, said receptacles further being longitudinally spaced on said shaft to provide clearance for said cutting blades, whereby upon rotation of said shaft the paths of motion of said receptacles intersect said cutting blades, and means for moving said shaft to follow the rotational and translational constraint thereof.

PAUL M. ANGELL.

REFERENCES CITED

The following references are of record in the file of this patent:

UNITED STATES PATENTS

| Number | Name | Date |
|---|---|---|
| 484,995 | Burns | Oct. 25, 1892 |
| 1,013,903 | Shaw | Jan. 9, 1912 |
| 1,882,139 | Giuffre | Oct. 11, 1932 |